May 1, 1934.   R. A. HULL   1,956,796
ILLUMINATING DEVICE FOR TABLE TOPS
Filed April 1, 1933
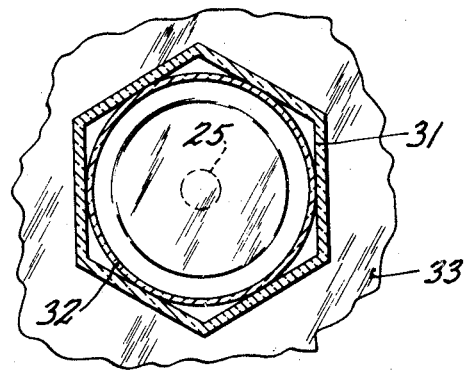
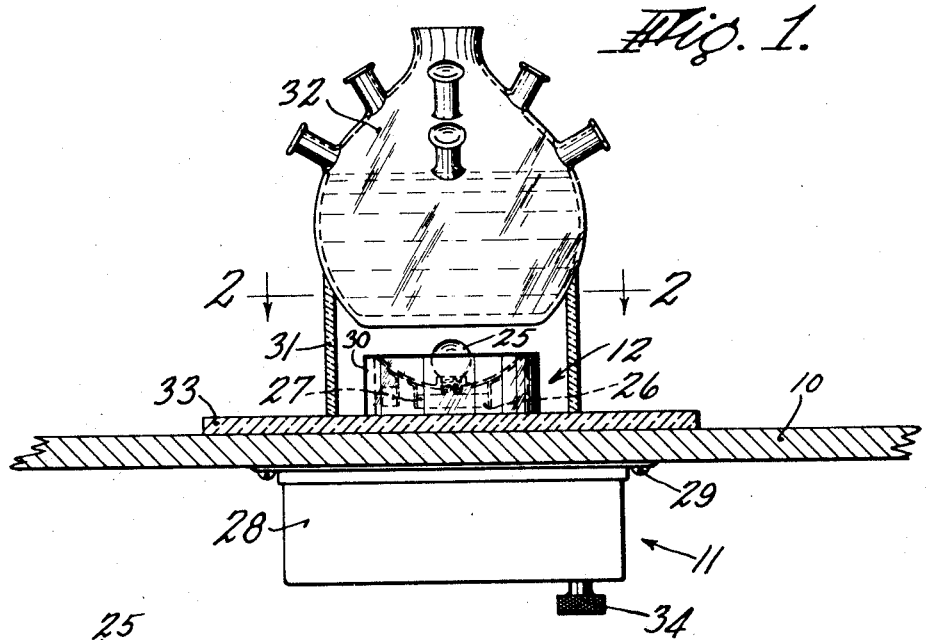
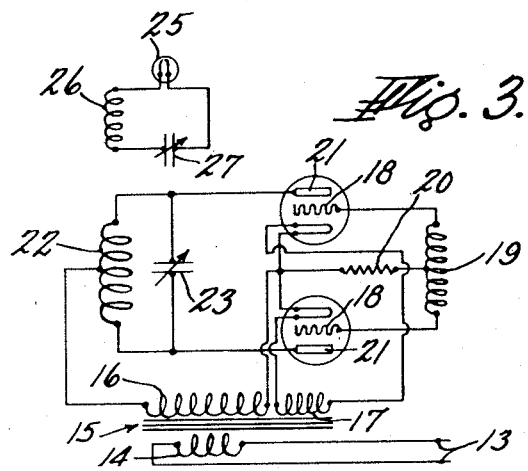
INVENTOR.
Ross A. Hull
BY Chapin & Neal
ATTORNEYS.

Patented May 1, 1934

1,956,796

UNITED STATES PATENT OFFICE 1,956,796

ILLUMINATING DEVICE FOR TABLE TOPS

Ross A. Hull, West Hartford, Conn., assignor to Edith C. Taylor, Hartford, Conn.

Application April 1, 1933, Serial No. 663,953

4 Claims. (Cl. 240—2)

This invention relates to an apparatus especially adapted for illuminating center-piece decorations, although it may have other analogous uses. It has long been recognized that the elaborate floral decorations used on dining tables at the more formal social functions could be given added beauty if it were possible to illuminate them, but the problem of conveying the necessary power without making holes through the table and table linen has not previously been satisfactorily solved. Proposals to install incandescent lamps lighted by current from batteries concealed in the center-piece have been made, but space limitations have prevented using this form of electrical current supply except for very small lights, and the necessary upkeep of batteries has entailed a high expense and a considerable bother. It has also been proposed to transmit power from below the table top to a point above it by splitting the core of an iron core transformer, placing the primary half of it below and the secondary half above the table; and then supplying the primary coil with alternating current. The efficiency of such a device is extremely low, due to the presence of a large air gap in the magnetic circuit, preventing any substantial transfer of energy; and the device has furthermore the disadvantage that since the commercial alternating current has a frequency corresponding to that of sound waves well within the audible range a bothersome noise was introduced, this being accentuated by the sounding board action of the table top.

I have found that it is possible to transmit a considerable amount of electrical energy from a point below the table top to a point above it, even though the portion of the apparatus above the table is supported on a mirror or other ornamental glass plate. According to the preferred embodiment of the invention the coil of a high frequency thermionic type oscillator is placed below the bottom of the table surface and a similar coil is placed in the center-piece assembly above the table. Both coils are made parts of suitable circuits mutually tuned to resonance. Now it is a peculiar property of similarly tuned and mutually coupled circuits operated at a sufficiently high frequency that the current through the secondary circuit will not be at a maximum with the closest possible coupling; but that, directly contrary to the case of untuned magnetic circuits as used in a transformer, the maximum secondary current will occur when the mutually acting coils are separated by a substantial amount. This property is employed to advantage in my invention as will be described below, for by a proper use of circuit constants the optimum coupling of the primary and secondary circuits can be made to correspond with the spacing of the units above and below the table top.

The preferred way in which these features of the invention are brought into practice will now be described in connection with the accompanying drawing, in which:

Fig. 1 is a side elevation of a device constructed in accordance with my invention, a supporting member being shown in section;

Fig. 2 is a section on line 2—2 of Fig. 1; and

Fig. 3 is a wiring diagram showing one conventional form of oscillating circuit.

As stated above, the device is formed in two parts separated by the table top 10. The lower part 11 preferably contains the oscillating circuit and the transmitting coil. The upper part 12 contains the receiving coil and the source of illumination. Since the mechanical arrangement of the parts may be changed within wide limits without changing the principle of action the invention will be described first with relation to the diagram shown in Fig. 3. Power for the device is derived from a source of current here shown as an alternating current line 13. This current passes through the primary coil 14 to a transformer 15 the secondary of which is made in two sections 16 and 17. The former is designed to furnish a relatively high potential which for the type of oscillating tube shown here may be of the order of 650 volts. The section 17 furnishes current for the tube filaments, and since these have been shown for convenience as connected in series will be designed to supply this current under a potential of about 15 volts. The tubes may be of the type commercially known as UX210. The grids 18 of these tubes are connected to opposite ends of a coil 19 which in the particular case shown has approximately eight turns of one inch diameter. The center of this coil is connected through a resistor 20 having a value of about 20,000 ohms to the filament circuit. One end of the high voltage sections of the transformer is likewise connected to this circuit. The plates 21 of both tubes are joined to opposite ends of a coil 22 connected at its center tap to the second end of the high voltage transformer section. Coil 22 is in the case shown composed of two turns of four inches diameter, and may for strength and current carrying capacity be conveniently formed of copper tubing of quarter-inch size. The ends of this coil are bridged by a condenser 23 of the order of 50 micro-micro farad capacity and preferably made variable to facilitate adjustment. This circuit operates as an oscillator of the push-pull type, the grid and plate circuits being coupled together through the internal capacity of the tube. Due to the fact that the plates are both positive at the same time and the absence of any current when the plates are negative the output will be pulsating, one half of the alternating current supply only being effective. The output current frequency will be of course vastly higher than the frequency of the sixty cycle alternating current source, being preferably of the order of twenty to forty-five megacycles, and due to the periodicity of the apparatus described will be in the form of periodic trains of high frequency. By using a center tapped transformed the tubes can be arranged to function alternately and thus to provide a continuous wave train, but this would require more expensive apparatus and for this reason the form described is preferred. For all practical purposes of illumination the current may be considered as steady.

The receiving or illuminating circuit is composed of a lamp 25, such as a six volt twenty-one candle power automobile light; a coil 26, here of three turns three inches in diameter; and a condenser 27, here shown as variable for adjustment and of the order of 100 micro-micro farad capacity. Both the coil 22 and the coil 26 are preferably arranged as solenoids with their axes vertical and in alignment. The lower unit 11 is preferably encased in a cover or shield 28, screwed to the table top at 29. The shield may be grounded if desired. In order to avoid any hum the transformer 15 may be placed in the cellar or other convenient place, but the remaining apparatus is preferably placed in the shield in order to keep the high frequency leads as short as possible. The receiving circuit is placed in a case 30 located within an ornamental frame 31 on which may be placed a transparent flower vase 32 or other device which is to be illuminated. A glass plate or mirror 33 may be used if desired to add to the ornamental effect.

The structure and circuit described has the advantage that it operates on a frequency at which the optimum coupling between the coils 22 and 26 is of the order of the combined thickness of the table top and plate 33, plus the necessary spacing of the coils from the opposite surfaces of these members. Adjustment for individual installations can readily be obtained by means of the variable condensers, an accessible handle 34 being provided for the condenser 23. The particular oscillating circuit described is of course illustrative only, a number of suitable circuits being well known. The lamp has been shown as of the filament type, since this type is readily obtainable. A lamp of the ionized gas type could, however, be employed with equal facility.

It will be understood that by timing the circuits 22 and 26 into resonance the maximum transfer of energy will be obtained with consequent brightness of the light 25 and this timing is conveniently accomplished by the knob 34. The brilliancy of the light 25 may thus be varied as desired by operation of said knob 34.

What I claim is:

1. A device for illuminating ornamental center-piece units on an imperforate table top or for similar purposes, comprising a tuned electrical circuit located beneath the table top, a second electrical circuit located above the table top, tuned substantially to resonance with the first circuit, and electro-magnetically coupled thereto, a lamp included in said second circuit, and means for supplying to the first circuit an alternating current of the frequency to which said circuits are tuned, said frequency being of such value that optimum coupling between the circuits requires a spacing therebetween of the order of the thickness of the table top.

2. A device for illuminating ornamental center-piece units on an imperforate table top or for similar purposes, comprising a tuned electrical circuit located beneath the table top, a second electrical circuit located above the table top, tuned substantially to resonance with the first circuit, and electrically coupled thereto, a lamp included in said second circuit, and means for supplying an alternating current to the first circuit of a frequency of the order of twenty to forty-five megacycles.

3. A device for illuminating ornamental center-piece units on an imperforate table top or for similar purposes, comprising a tuned electrical circuit located beneath the table top and comprising a coil with a vertical axis positioned adjacent the under surface of the table and a condenser bridged across said coil, a second electrical circuit located above the table top and comprising a coil with a vertical axis positioned adjacent the upper surface of the table and in substantial alignment with the first coil, and a condenser bridged across said second coil, said coils and condensers being so proportioned that they are resonant to a frequency at which the optimum coupling between the coils is at substantially the distance to which the coils are separated by the table top, a lamp included in said second circuit and means for supplying the first-named circuit with alternating current at said frequency.

4. A device for transmitting power through an imperforate table top or the like for illumination or similar purposes, comprising a tuned electrical circuit located beneath the table top, a second electrical circuit located above the table top, tuned substantially to resonance with the first circuit and electro-magnetically coupled thereto, and means for supplying to the first circuit an alternating current to which said circuits are tuned, said frequency being of such value that optimum coupling between the circuits requires a spacing therebetween of the order of the thickness of the table top.

ROSS A. HULL.